United States Patent Office 2,711,084
Patented June 21, 1955

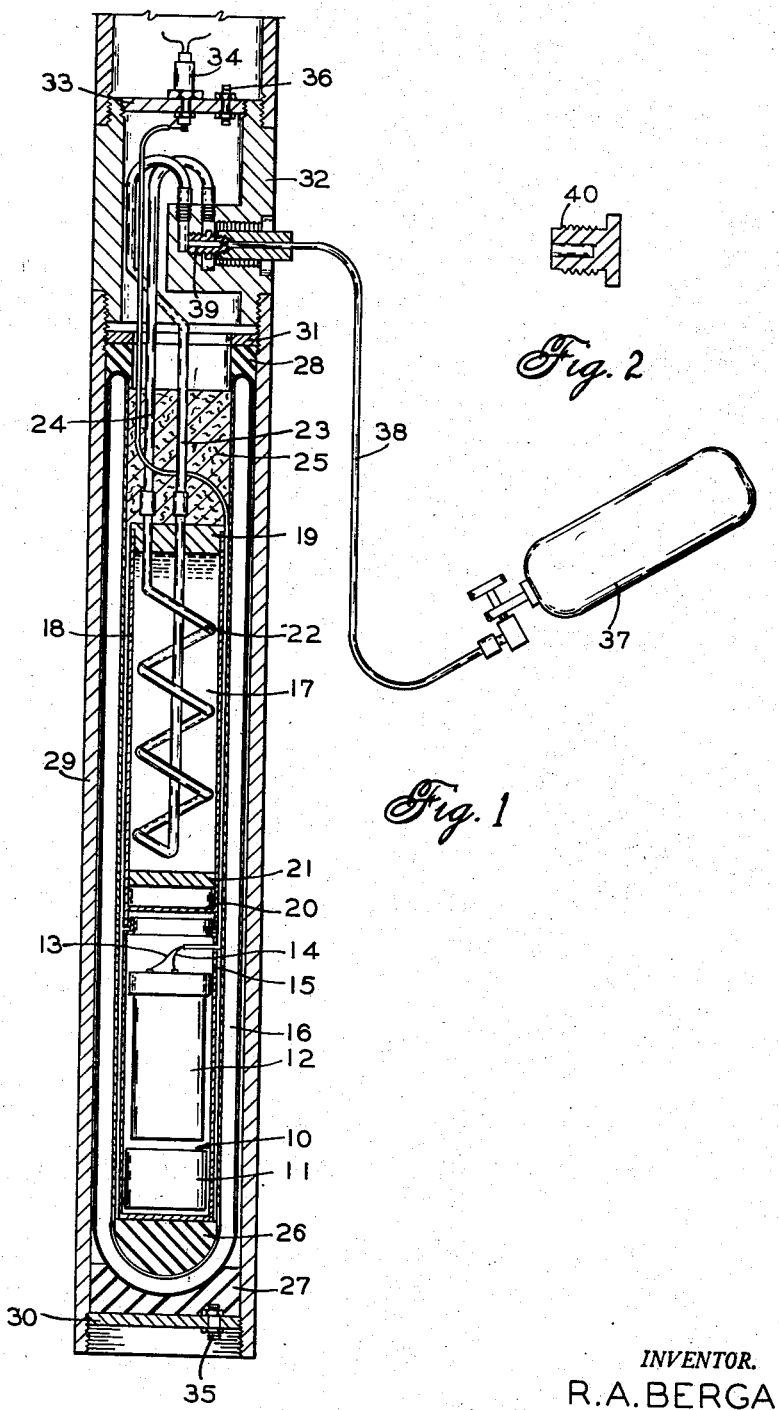

2,711,084

REFRIGERATION SYSTEM FOR WELL LOGGING INSTRUMENTS

Reuben Allard Bergan, Tulsa, Okla., assignor to Well Surveys, Incorporated, Tulsa, Okla., a corporation of Delaware Application August 30, 1952, Serial No. 307,357

4 Claims. (Cl. 62—92)

This invention relates to the art of geophysical prospecting and more particularly to the art of radioactivity well logging utilizing a scintillation counter for detecting radiation.

It is old in the art to log oil wells by measuring the natural radioactivity of the strata or by irradiating the strata adjacent the drill hole with fast neutrons or penetrating gamma radiation and simultaneously traversing the well with a gamma-ray or neutron detector or both. Such detectors have heretofore been of the type which employ a gaseous ionizable medium and produces electrical pulses or continuous current. The recently developed scintillation counters having solid or liquid detection media have certain advantages over the gaseous detectors of the prior art. Their greater density permits the use of a smaller size detector which is desirable in the small space available in a well logging instrument; their low resolving time permits high speed counting; their high efficiency provides a good signal-to-noise ratio; and their high stopping power is useful in gamma-ray and high-energy particle detection. Although the scintillation counter has desirable qualities for use in well logging, it is difficult to use, for it involves the use of fluorescent media which operate unsatisfactorily under the high ambient temperatures found in oil wells, and the use of photosensitive surfaces which are subject to deterioration at temperatures above 170° F. Furthermore, high temperatures cause more thermal noise in the photomultiplier of the scintillation counter. The temperatures encountered in deep wells may be as high as 400° F.

Attempts have been made to overcome difficulties arising from temperature effects on conventional detectors. These attempts have involved the use of solid insulators. These have not been entirely successful for even the best solid insulators permit heat conduction at too great a rate to be tolerated in radioactivity well logging. There is insufficient space in a standard (3⅝" O. D.) instrument to allow the use of enough solid insulation to produce a great enough time-lag in change of temperature of critical elements.

All of the above enumerated difficulties apply with greater force to systems utilizing scintillation counters as the detecting elements. The instant invention overcomes these difficulties by providing novel means for producing a predetermined temperature environment for the scintillation counter and maintaining the environment at the chosen temperature.

This is accomplished by enclosing the photomultiplier tube and the scintillation medium in an insulating container, such as a Dewar flask, along with a thermal capacitance such as a capsule of water. The water is frozen by expanding a refrigerant in a heat exchanger disposed within the capsule. The heat exchanger is connected to a port in the external housing of the subsurface instrument. The port is provided so that refrigerant from an outside detachable source can be expanded into the heat exchanger and exhausted to the atmosphere or to the suction side of a compressor type refrigerating machine. The port is provided with a closure plug for use when the instrument is lowered into the well.

This invention eliminates the necessity for opening the instrument in the field. It is undesirable to open delicate well logging equipment in the oil field; any opening should be done in the laboratory under technical supervision. Furthermore, frequent opening may wear and damage fluid-tight seals, and the more often the instruments are sealed, the greater the likelihood of leakage; any leakage of well fluid into the instrument will render the instrument inoperative. Even though no well fluid be permitted into the instrument housing, any opening of the housing may result in the contamination of the enclosed atmosphere, which must be kept clean and dry, especially when glass vacuum bottles are used. Glass vacuum bottles are delicate; moisture and other contaminants contribute to failure of glass, as well as electrical insulation. To ensure a proper atmosphere, the instrument is filled with dry, inert gas and sealed. If the atmosphere is to be maintained inert and dry, the instrument should not be opened except in the laboratory.

In the preferred form of this invention the heat may be extracted from the instrument by the expansion of a refrigerant such as liquid carbon dioxide into the heat exchanger. The cool gas is passed through coils surrounded by water, thereby freezing the water. The spent gas is exhausted into the outside air. Liquid carbon dioxide is especially suited for the purpose. It has a relatively high heat of vaporization at reasonable temperatures—approximately 100 B. t. u./lb. at 32° F. It is readily available everywhere at a moderate cost. It is readily stored in commercial containers. It is non-poisonous and safe to handle. No auxiliary pumps or other mechanical or electrical equipment is necessary, for the container of liquid carbon dioxide may be coupled by hose directly to the instrument housing. The container may be moved anywhere and is available for freezing the water at the well head without removing the instrument from the logging cable for repeat runs.

Since the interior of the instrument must be kept clean and free from water vapor, it is necessary to keep the water for thermal capacitance in a sealed container. At the same time, since water expands upon freezing, there must be room for expansion in the sealed container. In order that the water may be readily frozen with the instrument either vertical or horizontal, the water chamber should be full of water. Therefore, the sealed container is divided by a piston into gas and water chambers. Upon freezing of the water, the piston moves to permit expansion, compressing the gas.

Therefore, the primary object of this invention is to provide a novel well surveying system. Another object is to provide a novel method and apparatus for cooling a scintillation counter logging instrument. Still another object is to provide in a well surveying subsurface instrument a heat exchanger and a thermal capacitance which can be rendered effective to cool the interior of the instrument from the exterior thereof without opening the instrument. Still another object of this invention is to provide cooling for a scintillation counter instrument without contamination of the interior of the instrument. Other objects and advantages of the present invention will become apparent from the following detailed description when considered with the acompanying drawings, in which:

Figure 1 is a vertical sectional view of well surveying apparatus constructed in accordance with this invention; and Figure 2 is a plug to seal the apparatus shown in Figure 1 from the effects of well fluid.

In the art of radioactivity well logging, logs are made by measuring the gamma radiation naturally emitted by the strata surrounding a well or they are made by irradiating the strata with fast neutrons or penetrating gamma radiation and simultaneously detecting gamma radiation or neutrons thereupon coming from the strata. The scintillation counter may be used for radioactivity well logging, but it must be protected from the high temperatures found in many wells. In logging, the scintillation counter produces electrical pulses at a rate and of a size dependent upon the incident radiation. These pulses are amplified and sent to the surface over a cable. At the surface the pulses may be further amplified. The rate of occurrence of pulses is recorded on a recorder as a function of the depth at which detection occurred, thereby producing a well log. In Figure 1 of the drawings there is illustrated the detector part of the subsurface instrument used in such a well logging system in which the refrigeration method of this invention is utilized.

The detector of radiation shown in Figure 1 comprises scintillation counter 10 which consists of phosphor 11 and photomultiplier 12. Power is supplied to photomultiplier 12 and output pulses are transmitted from photomultiplier 12 through wires 13 and 14. The applied voltage is of the order of 1000 volts. The photomultiplier 12 includes the proper voltage divider for applying the proper voltages to the various dynodes of the photomultiplier tube. The scintillation counter is mounted rigidly in counter housing 15. The scintillation counter is insulated from hot bore holes by the glass vacuum bottle 16. Since even the best insulation permits a gradual rise of temperature, thermal capacitance is necessary to maintain a constant temperature. Thermal capacitance is supplied in the form of melting ice 17 also disposed within the glass vacuum bottle. To prevent leakage of the water into the detector and onto the glass vacuum bottle, the water is sealed in a container formed by hollow cylinder 18 and seals 19 and 20. This water container is fastened rigidly to the counter housing 15. The water container is divided into two parts by piston 21 which confines the water to one part and gas to the other part. Movement of the piston to compress the gas as the water expands upon freezing permits freezing of the water without breakage of the container or of the vacuum bottle. A diaphragm may be used instead of the piston, or closed cell sponged rubber may replace the piston and gas chamber. Metallic cooling coil 22 is a heat exchanger by which heat is removed from the water in order to freeze it. The coolant enters the cooling coil 22 through flexible tube 23 and is exhausted through flexible tube 24. These tubes pass through solid insulator 25 which serves to insulate the open end of vacuum bottle 16. This solid insulation may be of hair felt. Tubes 23 and 24 must be made of insulating material also. Rubber cushion 26 is placed between the bottom of vacuum bottle and its contents. The vacuum bottle is mounted on rubber cushions 27 and 28 within hollow cylinder 29 which is part of the instrument housing exposed to the well. Cylinder 29 is made strong enough to withstand the pressures found in deep wells. Plug 30 closes one end of cylinder 29. The contents of cylinder 29 are firmly held in place by retaining ring 31. Hollow coupling 32 is threaded to fasten securely to cylinder 29. Plug 33 closes the end of coupling 32 to form a gas-tight chamber within cylinder 29 and coupling 32. Wires 13 and 14 are connected to electrical connector 34 which permits conduction of the power into the gas-tight chamber and pulses from the gas-tight chamber. Plugs 30 and 33 are provided with valves 35 and 36 respectively through which a dry, inert atmosphere may be introduced and contaminants removed. This maintains an inert dry atmosphere in contact with the detector and the glass vacuum bottle.

To provide for the cooling of the scintallation counter, the water 17 is frozen while the instrument is on the surface without opening the instrument housing to atmospheric contamination. The water is frozen by introducing liquid carbon dioxide through a port in the coupling 32. Carbon dioxide is a liquid at ordinary temperatures only under high pressure. The liquid carbon dioxide is caused to flow from the container 37 through high pressure tube 38 to fitting 39. There is a small orifice through fitting 39 through which the carbon dioxide expands into the gaseous phase with resultant absorption of heat. The cool gas passes through tube 23 to cooling coil 22 where it absorbs heat from the water thereby freezing it. The exhausted gas passes through tube 24 into the atmosphere. After the water has been frozen the high pressure tube 38 is removed from the fitting 39 and the orifice and exhaust vent are both sealed by a screw plug 40, shown in Figure 2, which seals the coolant tubes while the instrument is in the well. This position of the orifice results in waste of cooling power for heat is absorbed by the cool gas from the orifice to the cooling coil 22 without doing useful work. The cooling system would operate more efficiently were the orifice placed at the junction of tube 23 and cooling coil 22. However, this position would require disassembly of the instrument to clean or change the orifice. Furthermore, high pressure tubing and couplings are necessary where the carbon dioxide is in the liquid phase under pressure.

In operation a thermal capacitance comprising 200 grams of ice has been found to be sufficient to log practically all wells exhibiting high temperatures. With the present invention this amount of ice can be frozen from a starting temperature of approximately 75° F. by using liquid carbon dioxide at the same temperature in from 8 to 15 minutes. The amount of carbon dioxide required to effect this freezing is approximately 2.3 pounds. Two hundred (200) grams of ice enclosed within the Dewar flask along with the scintillation counter will maintain the interior of the Dewar flask at a temperature of approximately 45° F. for a period of about 10 hours in a well have an average temperature top to bottom thereof of approximately 185° F. This is ample time to log a well 15,000 feet deep having a top hole temperature of approximately 80° F. and a bottom hole temperature of approximately 360° F.

Although the use of liquid carbon dioxide is described for freezing the ice, other refrigerants such as ammonia may be passed through tubes 23 and 24 and cooling coil 22.

It is to be understood that this invention is not to be limited to the specific modifications described, but is to be limited only by the following claims:

I claim:

1. An apparatus for cooling a well logging detector that comprises an instrument housing, thermal insulation disposed within said housing, said detector disposed within said insulation, a sealed container also disposed within said insulation, movable means dividing said sealed container in two parts, water disposed within one of said two parts, gas disposed within the other of said two parts, a cooling coil disposed within said water, a source of refrigerant external to said instrument housing, sealed means for conducting said refrigerant from said source to said cooling coil, and sealed means for conducting the spent refrigerant from said cooling coil to the outside of said housing.

2. An apparatus for cooling a well logging detector that comprises a sealed instrument housing, an inert and dry atmosphere confined within said housing, thermal insulation also disposed within said housing, said detector disposed within said insulation, a sealed container also disposed within said insulation, water disposed within said sealed container, a cooling coil also disposed within said sealed container, a source of refrigerant external to said instrument housing, sealed means for conducting said refrigerant from said source to said cooling coil, and sealed means for conducting the spent refrigerant from said cooling coil to the outside of said housing.

3. An apparatus for cooling a well logging detector that comprises an instrument housing, thermal insulation disposed within said housing, said detector disposed within said insulation, a sealed container also disposed within said insulation, water disposed within said sealed container, expansion means to permit said water to expand within said sealed container, a heat exchanger disposed in contact with said water, a source of refrigerant external to said instrument housing, sealed means for conducting said refrigerant from said source to said heat exchanger, and sealed means for conducting the spent refrigerant from said heat exchanger to the outside of said housing.

4. An apparatus for cooling a well logging detector that comprises an instrument housing, thermal insulation disposed within said housing, said detector disposed within said insulation, a sealed container also disposed within said insulation, movable means dividing said sealed container in two parts, thermal capacitance disposed within one of said two parts, gas disposed in the other of said two parts, a heat exchanger disposed in contact with said thermal capacitance, a source of refrigerant external to said instrument housing, sealed means for conducting said refrigerant from said source to said heat exchanger, and sealed means for conducting the spent refrigerant from said heat exchanger to the outside of said housing.

References Cited in the file of this patent

UNITED STATES PATENTS

| | | |
|---|---|---|
| 1,380,987 | Lippincott | June 7, 1921 |
| 1,870,696 | Taylor | Aug. 9, 1932 |
| 1,876,915 | Gordon | Sept. 13, 1932 |
| 2,016,377 | Krotzer | Oct. 8, 1935 |
| 2,324,103 | Miller | July 13, 1943 |
| 2,433,554 | Herzog | Dec. 30, 1947 |
| 2,671,323 | Richert | Mar. 9, 1954 |
| 2,686,268 | Martin et al. | Aug. 10, 1954 |

OTHER REFERENCES

"Solid Counters," Wouters AECD–2203, August 5, 1948, published by the Atomic Energy Commission, Oak Ridge, Tennessee, pp. 1–5.